United States Patent [19]

Andersen et al.

[11] 4,369,425
[45] Jan. 18, 1983

[54] VOICED ALERTING SYSTEM

[75] Inventors: David P. Andersen; Eugene P. Chicoine, both of Burnsville, Minn.

[73] Assignee: Sperry Corporation, New York, N.Y.

[21] Appl. No.: 271,333

[22] Filed: Jun. 8, 1981

[51] Int. Cl.³ .................... G01C 23/00; G01C 21/20
[52] U.S. Cl. .................................. 340/26; 340/539; 364/461
[58] Field of Search ..................... 340/26, 27 R, 539; 364/461

[56] References Cited

U.S. PATENT DOCUMENTS 2,825,054  2/1958  Ernst .................................... 340/26
4,302,745  11/1981  Johnston et al. ................. 340/27 R

OTHER PUBLICATIONS

Parker et al., "An Automated Pilot Advisory System," Proceedings of Southeastern 1978, Region 3, Conf., 10-12, Apr. 1978, Atlanta, Ga.

*Primary Examiner*—Glen R. Swann, III
*Attorney, Agent, or Firm*—William C. Fuess; Kenneth T. Grace; Marshall M. Truex

[57] ABSTRACT

A ground-to-air, voiced alerting system whereby a ground controller can communicate traffic warning messages to a pilot in an automatic fashion via a voice radio band and a voiced message generator. The system generally comprising means for transmitting a frequency shift key (FSK) encoded message to the pilot via the voice band and receiver means for decoding the same message. The decoding means, in turn, generally comprising means for identifying specific aircraft and additional means for decoding the message and producing the voiced message over the pilot's head set.

4 Claims, 9 Drawing Figures

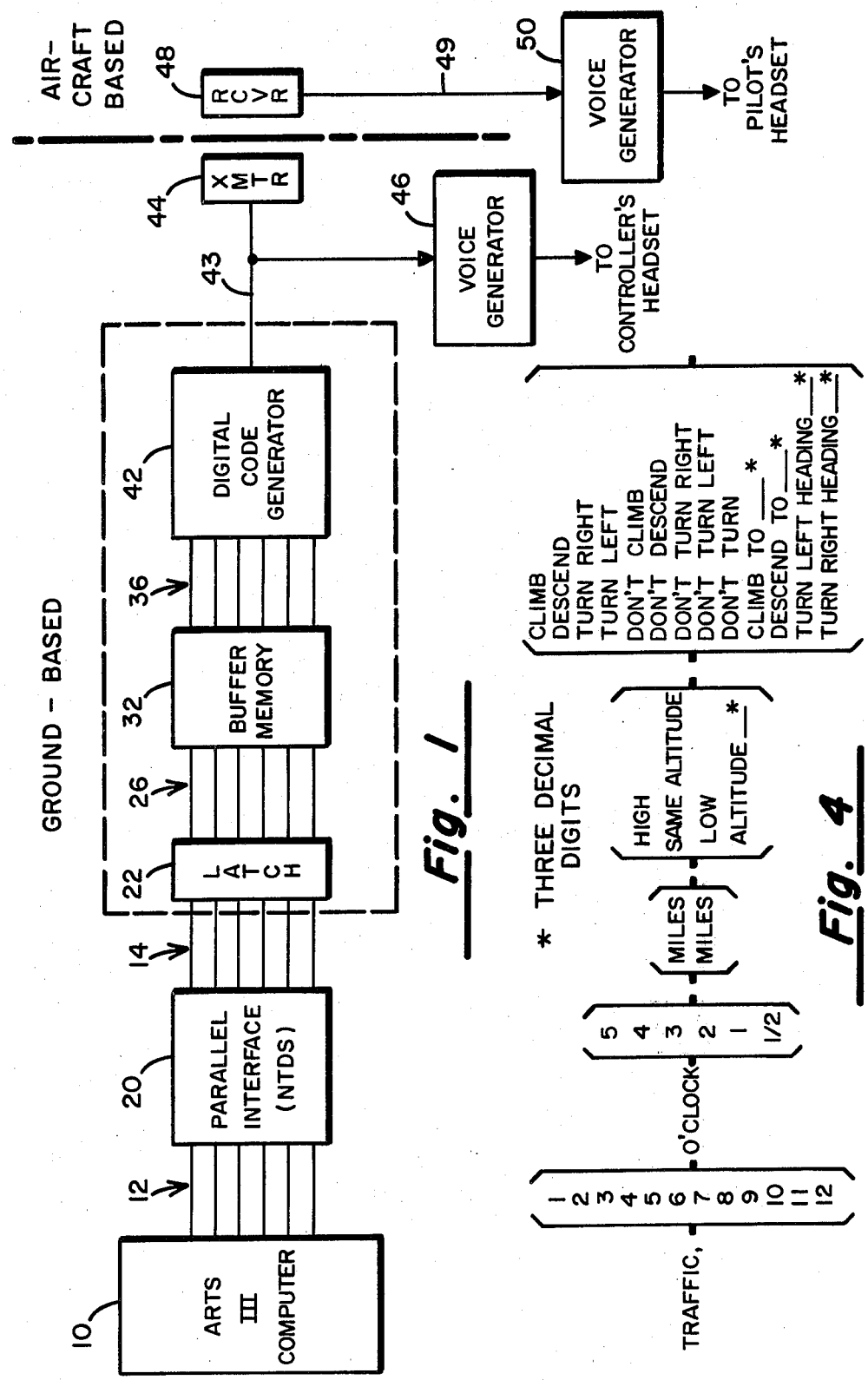

| FSK MESSAGE FORMAT | | | | | | |
|---|---|---|---|---|---|---|
| 100 MSEC CARRIER TONE | SYNC CODES (3) | START OF MESSAGE CODE (1) | A/C IDENT CODE (7 DIGITS) | VOCAB. UNIT CODE (1 TO 31 CODES) | END OF MESSAGE CODE (1) | CHECK SUM CHARACTER |

| VOCABULARY ||
|---|---|
| VOCABULARY UNIT CODE | VOCABULARY UNIT |
| 00 | ZERO |
| 01 | ONE |
| 02 | TWO |
| 03 | THREE |
| 04 | FOUR |
| 05 | FIVE |
| 06 | SIX |
| 07 | SEVEN |
| 08 | EIGHT |
| 09 | NINER |
| 10 | TEN |
| 11 | ELEVEN |
| 12 | TWELVE |
| 13 | TRAFFIC |
| 14 | O'CLOCK |
| 15 | MILE |
| 16 | MILES |
| 17 | HALF |
| 18 | THOUSAND |
| 19 | HIGH |
| 20 | LOW |
| 21 | SAME |
| 22 | ALTITUDE |
| 23 | HUNDRED |
| 24 | CLIMB |
| 25 | DESCEND |
| 26 | TURN |
| 27 | RIGHT |
| 28 | LEFT |
| 29 | DON'T |
| 30 | CLIMB TO |
| 31 | DESCEND TO |
| 32 | HEADING |

*Fig. 3*

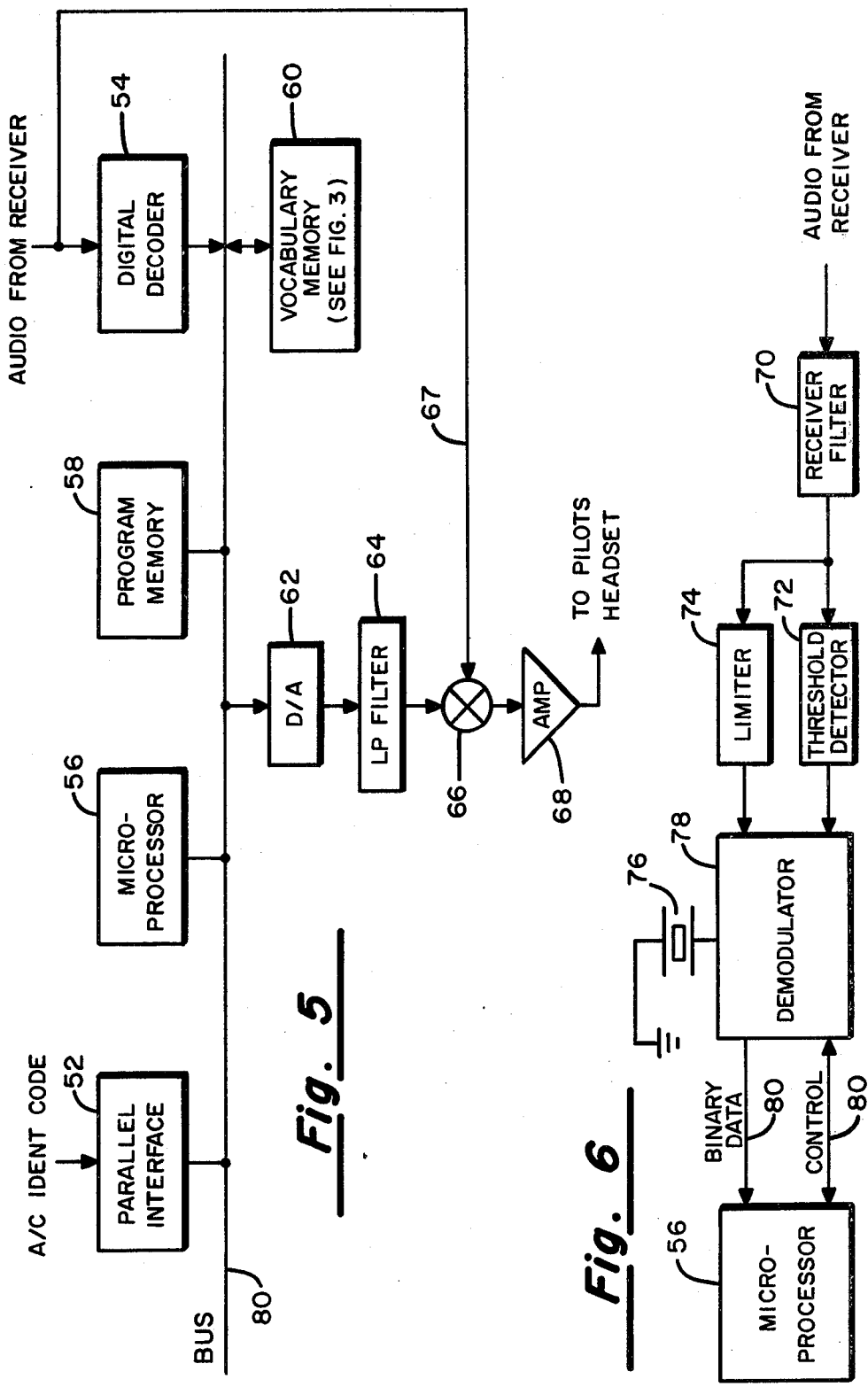

VOICED ALERTING SYSTEM

BACKGROUND OF THE INVENTION

The present invention relates to voiced communication systems and in particular to a ground-to-air communication system, whereby FSK encoded messages can be transmitted over a voiced radio band and from which transmissions the encoded messages can be decoded to produce voiced messages.

A major problem in most air traffic control centers is that over the years, as the amount of air traffic has increased, it has become more and more difficult for a ground controller to monitor each and every aircraft and keep the individual aircraft advised of their relative positions with respect to other aircraft within an area of space. While the individual aircraft are monitored by systems such as the Sperry Univac ® Automatic VFR Advisory Service (AVAS) which employs the Automated Radar Tracking System (ARTS III) it becomes very difficult, due to the limited time bandwidth of the controller's radio channel, to communicate collision-avoidance messages to all pilots. This problem is especially critical during periods of high traffic density and during which periods traffic-warning messages are occasionally lost or delayed due to radio channel saturation. From the standpoint of air traffic safety, it is therefore highly desirable if the AVAS system were also able to automatically advise each pilot independent of controller action as well as to be able to transmit more messages in any given period of time. Such an improved system would also reduce the ground controllers workload, conserve radio channel use and increase the maneuvering time available to aircraft.

It is therefore a primary object of the present invention to transmit digital messages, via FSK encoded analog signals over a ground controller's voice radio band, to an identified aircraft and to decode the message and produce a voiced traffic warning to a pilot over his head set.

It is also an object of the present invention to accomplish the former objective using readily available circuitry but configuring the same in a system that has a vocabulary sufficient to accommodate the majority of the traffic-warning messages which might typically be transmitted from a ground controller.

It is a further object of the present invention to produce a system which is compatible with the Discrete Address Beacon System/Army Tactical Airspace Regulation System (DABS/ATARS) or with the Air Traffic Control Radar Beacon System (ATCRBS). Thus permitting the transmissions of alerts, warnings and resolutions in automatic or semi-automatic fashion.

These objects and others will become more apparent upon a reading of the hereinafter described apparatus.

SUMMARY OF THE INVENTION

A ground-to-air voiced alerting system that enables the transmission of air traffic warning messages to identified aircraft over a voice radio band. The encoded messages, upon receipt, being digitally decoded and processed to produce the corresponding voiced message that is received by the pilot over his head set.

The system generally comprising an air traffic control system for monitoring air traffic and producing digital data indicative of the relative positional differences between aircraft. The system also comprising means responsively coupled to the digital data for producing an FSK encoded message and means for transmitting the FSK encoded signal as a series of audio tones over a controller's voice radio band. The system further comprising means for receiving the FSK encoded message and decoding the message via a voice generator that produces a voiced message to the pilot.

The voice generator, in turn, comprising analog-to-digital decoding means for receiving the audio signal and identifying particular aircraft. The voice generator further comprising means for processing the message by selecting adaptive differential pulse code modulated (ADPCM) encoded words from a vocabulary memory and converting the words into an analog format so that they may be understood by the pilot as a voiced message.

BRIEF DESCRIPTION OF THE DRAWINGS

FIG. 1 is a generalized block diagram of the present improved ground-to-air air traffic warning system.

FIG. 3 is an exemplary listing of the vocabulary unit codes and the corresponding vocabulary units that are stored in the vocabulary memory of the preferred embodiment.

FIG. 4 is an example of the alternative voiced messages that may be transmitted.

FIG. 5 is a generalized block diagram of the voice generator that is typically contained on each aircraft.

FIG. 6 is a block diagram of the digital decoder contained within each voice generator.

DESCRIPTION OF THE PREFERRED EMBODIMENT

Figures 2A, 2B:
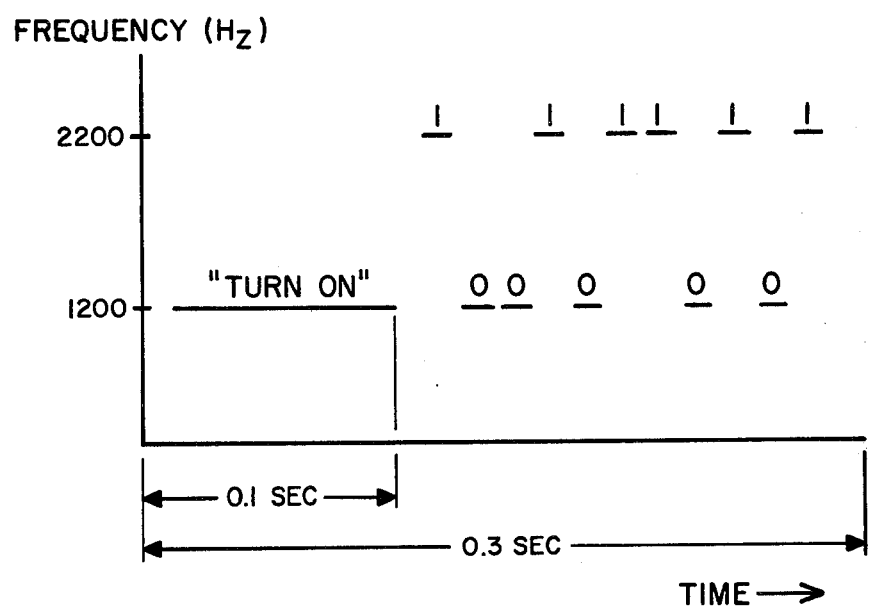
FIG. 2a is an example of the FSK message format.
FIG. 2b is a diagram of the modulating/demodulating scheme by which the FSK messages are encoded/decoded.

Referring to FIG. 1, a generalized block diagram is shown of the major elements contained within the present voiced alerting system. As indicated, the present voiced alerting system is essentially a subsystem adaptable to presently existing air traffic control systems, such as the ARTS III System that is available from the Sperry Univac Division of Sperry Corporation. The operation of the ARTS III System, however, is generally well known to those skilled in the art, and since information relative thereto is readily available upon contacting Sperry Univac, its operation will not be described in detail.

While such a system is required for the present invention to operate, its primary function is to supply the relative positional information of the various aircraft within any area of space to a ground controller, and who in turn transmits an appropriate traffic warning message. As mentioned and to date, such messages have been individually transmitted via the ground controller's spoken speech on a dedicated ground controller's radio channel. Such transmissions have thus been dependent upon the controller's time availability and the density of the traffic at any given point in time. The present system differs, however, in that while the particular position information is still available, it now is coupled in an appropriate parallel format to the present automatic voiced alerting system. Thus, the digital data from the ARTS III System is now supplied directly from the ARTS III System 10 via the single, six bit wide, parallel I/O channel 12 to the parallel interface 20, where data is received and retransmitted via the six bit data channel 14 to the latch 22, where the data is temporarily latched. The parallel interface 20 typically is of a Naval Tactical Data System (NTDS) type that conforms to Mil. Std. 1750A, such as the corresponding Sperry Univac NTDS type interfaces described in Sperry Univac Specifications DS-4772. The latch 22 is also typically comprised of six flip-flops that temporarily hold the data prior to its being written into the buffer memory 32.

The particular data that is received and the particular message length, however, depend upon the relative positions of the aircraft, and thus the message length varies depending upon the circumstances at any point in time. In any event though, the data is sequentially shifted into the latch 22 and out of the latch 22 via the six bit data channels 14 and 26 to the buffer memory 32. The buffer memory 32 is typically configured as a first-in, first-out (FIFO) type memory and is sized to store at least the maximum length message. The buffer memory 32, in turn, transmits the parallel data to the digital code generator 42 via the six bit data channel 36, where the data is encoded into an FSK message.

During this encoding process, the digital code generator 42 reads the individual lines of parallel data at a 1200 bit per second rate and generates the FSK encoded messages. It is to be recognized, however, that the actual technique for generating the FSK encoded message is well known to those of skill in the art, but which technique will again be described below with respect to FIGS. 2a and 2b for the present invention. The FSK encoded messages are thus generated and transmitted serially to the ground transmitter 44, as well as to the voice generator 46, that is coupled to the controller's head set.

Referring to FIG. 2a, each FSK encoded message is generally comprised of a 100 millisecond carrier tone header followed by three synchronization codes, one start of message code, an aircraft indentification code, the coded message itself, an end of message code and a checksum character code, which essentially acts in the fashion of a parity check. The function served by each specific code will, however, be described in more detail hereinafter with respect to the operation of the voice generator 50. In general though, the length of each message is less than 0.3 seconds in duration. Each message also has a single level approximately 6 DB below the average speech level of the controller's voice radio band. And, the typical message is comprised of thirty-one or less codes; where each code consists of six binary bits.

Referring to FIG. 2b, each message is thus comprised of a series of codes, where each six bit code is comprised of six corresponding frequency modulated pulses. Each binary bit of each code thus corresponds to either a 1200 or 2200 Hz pulse for a respective binary "0" or "1". Each message, in turn, consists of the series of pulses and which messages, due to the 0.3 second time duration, are merely heard as a beep to any listener on the controller's voice band. It is to be noted though that the FSK coded messages are transmitted sequentially, so that it remains for the voice generator to properly decode the messages.

Returning now to the present description, it is to be noted that the block diagram of FIG. 1 contains two types of voice generators (i.e. voice generators 46 and 50). Each type of voice generator is essentially identical to the other, with the exception that voice generator 46 is ground based while the voice generators 50 are air based within the individual aircraft. The voice generator 46, however, also differs from the others in that it is programmed to respond to all aircraft identification codes, and therefore the voice generator 46 is able to monitor all of the messages that are produced by the ARTS III System. The controller is thus able to monitor and control all the FSK messages that are transmitted. The voice generator 46 consequently responds to all FSK encoded messages and converts the audio signals into voiced messages that are comprehendible by the controller. It is to be noted, though, that while the above description typically contemplates a controller's monitoring each audio message, the controller may choose not to, just as easily as choosing to adjust the timing and sequence of the messages. It is to be noted also that the controller may initiate messages to aircraft before previous messages have been completed, so that different messages will be heard by pilots of different aircraft, nearly simultaneously. In this case voice generator 46 would convert only the first message in the sequence of time-overlapped messages into voice audible to the controller. The ultimate objective of any control scheme, however, is to place the control of all advisory messages under the controller's auspices, unless he or she chooses to select an automatic mode, whereby the messages will be transmitted against some priority criteria.

Thus, it is to be noted that while numerous messages are generated by the ARTS III System and the present ground control apparatus, the messages are typically reviewed prior to transmission. It is also to be noted that since each message is only approximately 0.3 seconds in duration, significantly more messages than before can be transmitted within a given time period to all the aircraft within the controller's scope of responsibility. It is to be noted, too, that while each message is transmitted by the airport radio transmitter 44 to all the aircraft within the controller's area of responsibility, the complete message is only decoded by those aircraft having a corresponding identification code. Each identical aircraft thus receives the individual messages via their receivers 48, decodes the messages via their voice generators 50 and produces the voiced message for the pilot.

Referring now to FIG. 3, the stored vocabulary that is used by the present voiced alerting system is shown in detail. Specifically, thirty-three encoded words are provided and which words are accessed via their respective six bit vocabulary unit codes (shown in decimal form). Thus, each six bit byte or code corresponds to one voiced word, and each message of up to thirty-one vocabulary unit codes and when organized according to the message format of FIG. 4 comprises an intelligent message.

Thus, referring to FIG. 4, the alternative voiced messages are shown that may be transmitted via the apparatus of the present preferred embodiment. Each message generally states that traffic exists at some o'clock position relative to the identified aircraft, at some range from the identified aircraft, at some relative altitude and with some suggested advisory action. The messages are therefore relatively short and succinct and provide only the pertinent information that the pilot needs to react to any given traffic situation. It is to be recalled, too, that depending upon the cirumstances, the controller can interrupt at any time and redirect the pilot or queue the message to accommodate the situation. It is also to be noted that the voiced message provides specific information relative to altitude or headings and which information is voiced as three decimal digits.

Referrng now to FIG. 5, particular attention will be paid to the voice generators 50 that are contained within each of the aircraft. Each voice generator 50, as mentioned, is coupled to a receiver 48 within each aircraft and each receives all the traffic warning messages that are transmitted by the transmitter 44. Each voice generator 50, however, only decodes those messages that contain the aircraft's corrsponding aircraft identification code. In particular, each voice generator 50 is comprised of a parallel interface 52, a digital decoder 54, a microprocessor 56, a program memory 58, a vocabulary memory 60, as well as a digital-to-analog converter 62, low pass filter 64, mixer 66, and an amplifier 68. And, each voice generator 50 generally acts, upon receipt of an FSK message, to supply the message to the digital decoder 54, where the FSK signal is decoded and converted into a parallel byte of binary information at transistor transistor logic (TTL) levels. Before decoding the entire message, however, each message is sampled by each aircraft to see if the message contains a corresponding aircraft identification code. If a match doesn't occur, the message is ignored. If a match occurs though, the rest of the message is received and stored in a vocabulary index buffer of the microprocessor 56 and from which buffer the message is read and interpreted by the microprocessor 56. Prior to describing the operation of the voice generator 50 though, attention should be directed to the digital decoder 54.

Referring to FIG. 6, the digital decoder 54 is shown in detail and is generally comprised of a receiver filter 70, a threshold detector 72, a limiter 74, a 1 megahertz crystal oscillator 76, and a demodulator 78. While the principle of demodulating FSK signals is not new and can be performed by various modems, such as a Motorola Part No. MC6860 or a Bell Part No. 202, the present decoder 54 differs in that it receives its signals from an aircraft radio receiver, instead of a telephone line. It is therefore necessary that the decoder 54 filter the outside carrier bands from the FSK signals. The receiver filter 70 performs this function, and essentially filters out all frequencies outside the range of 1200 Hertz to 2200 Hertz. This bandpass filtering thus improves the detectability of the FSK message by increasing the signal-to-noise ratio. The filtered signal is then impressed upon the threshold detector 72 and which acts to detect when a received signal is of a sufficient level so that the demodulator 78 can act upon it. The limiter 74, at the same time, samples each of the filtered signals to determine whether or not the filtered signal is symmetric and within the dynamic range expected by the demodulator 78. If the filtered signal passes both the limiter 74 and the threshold detector 72, the demodulator 78 is then able to convert the work space frequency charges of the filtered signals into the parallel, TTL level binary signals. In this regard, attention is again directed to FIG. 2b, wherein the FSK modulating-demodulating criteria are shown, except that now the FSK signal is demodulated into its corresponding, coded TTL level binary signal. It should be noted that the demodulator 78 takes approximately 100 milliseconds to "turn on", but that the remaining 200 milliseconds are sufficient to demodulate the FSK message. It is to be noted too, that the demodulator 78 operates under the microprocessor 56's control via the control signals that are transmitted over the duplexed bus 80.

Upon demodulating each coded message, the demodulated message is transmitted in the parallel binary format at the TTL levels via bus 80 to the microprocessor 56. The microprocessor 56, which in the preferred embodiment is capable of responding to eight bit bytes of data and which typically is a Motorola 6802, Intel 8085 or an equivalent eight bit microprocessor, then controls the subsequent conversion of the received message into analog speech via the stored program of FIG. 7. Recalling though that each FSK message contains three sync codes and an aircraft identification code, it is first necessary for each voice generator 50 to synchronize and identify itself. This, however, assumes that the voice generator 50 has already initialized itself. Thus during the "Idle Loop" of the program, the voice generator 50 via the microprocessor 56 synchronizes itself to the sync codes and compares its preset aircraft identification code to the transmitted aircraft identification code. Assuming a match exists, the rest of the message is then received and stored in the vocabulary index buffer before being converted to a voiced message during the "Speak Message Loop."

Next, during the Speak Message Loop of the stored program, the microprocessor 56 coordinates a table lookup operation from the vocabulary memory 60 of each of the vocabulary units that correspond to the vocabulary unit codes that are contained in the demodulated message in the vocabulary index buffer. Upon looking up each vocabulary unit, the microprocessor 56 then converts each unit from its four bit ADPCM format into an eight bit pulse code modulated (PCM) format. The algorithm for performing this function being well known and described in an article by P. Cummisky et al entitled "Adaptive Quantization in Diffential PCM Coding of Speech" in the Bell System Technical Journal, Vol. 52, No. 7, September, 1972. The sequential, PCM formatted message is then transmitted over the bus 80 at a 6 Kolohertz rate to the digital-to-analog converter 62 where it is converted and subsequently transmitted as analog speech to the pilot. This conversion, however, will be described in greater detail hereinafter.

Figure 7A:
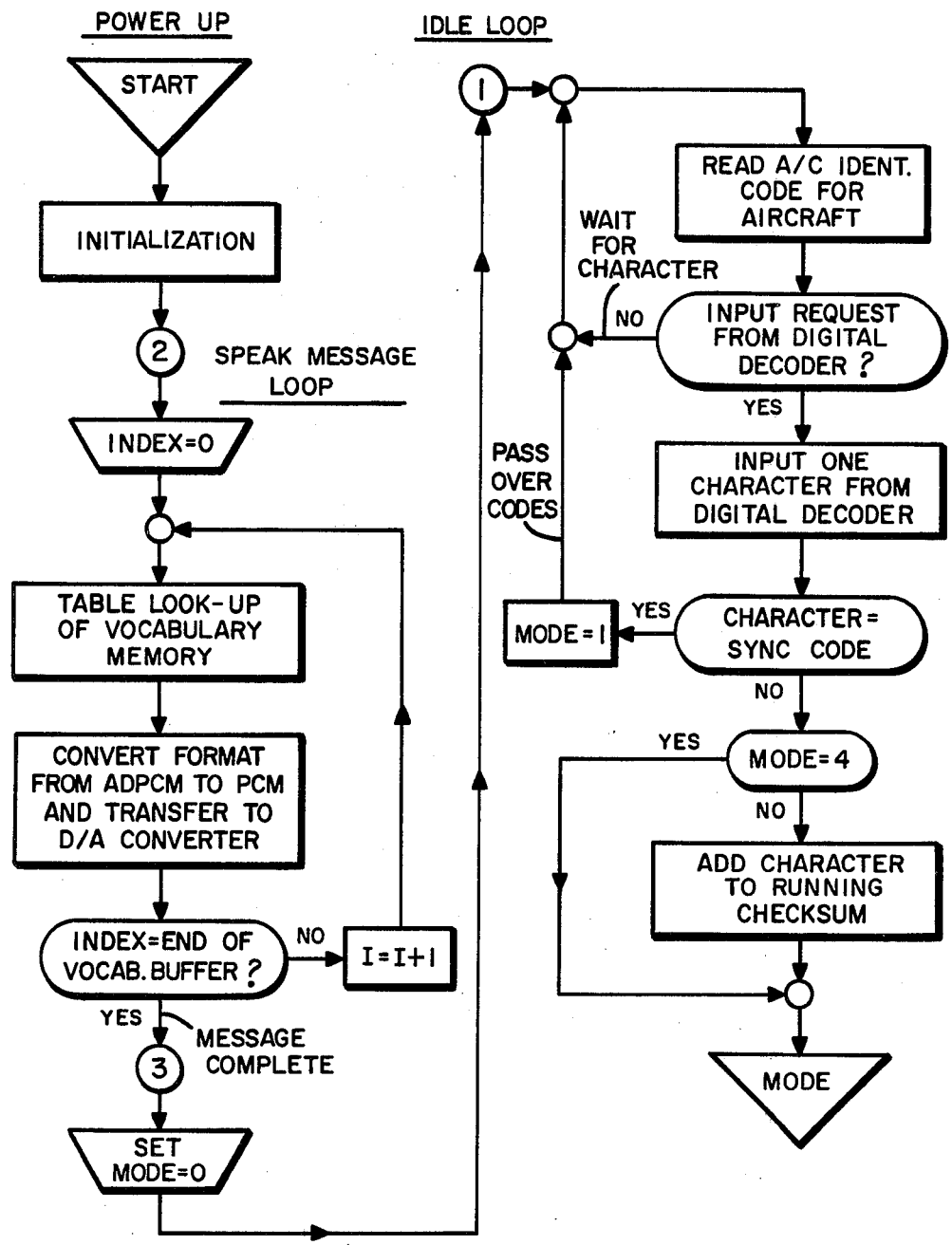
FIG. 7, comprised of FIG. 7a and 7b, is a flowchart of the program stored in the microprocessor's program memory.

Referring first though to the flow chart of FIG. 7, the program stored in the program memory 58 will now be described. Essentially, as mentioned, the program acts to direct the conversion of the received signal, and which it performs pursuant to FIG. 7a via the various modes of FIG. 7b and which modes are also shown in Table 1 below.

TABLE 1

| MICROPROCESSOR MODES | |
| --- | --- |
| Mode | Description |
| 0 | Waiting for sync code |
| 1 | Expecting start of message code |
| 2 | Expecting a/c identification code |
| 3 | Expecting vocabulary I.D. code |
| 4 | Expecting checksum |

Prior to receiving messages though, it is necessary to "power up" and "initialize" each voice generator 50, and which initialization process also typically includes running a test message to ensure that the apparatus is operating properly. Specifically, during initialization the parallel interface 52 and the digital decoder 70 are enabled and the test message stored in the microprocessor 56's internal read only memory (ROM) is inserted into the vocabulary index buffer. The program then enters its "Speak Message Loop" and samples the successive index values stored in its ROM and thus performs a table lookup of the contents of each vocabulary unit code or address in the vocabulary memory 60. It does this by locating each unit code or address in vocabulary memory 60 and each corresponding vocabulary unit, and which vocabulary unit information is then transferred to the digital-to-analog converter 62 where each ADPCM sample of that test message is converted to the PCM format, until the end of the test message is reached. The microprocessor 56 thus queries the vocabulary index buffer after accessing each vocabulary unit to determine if any additional vocabulary units are stored therein. If additional units are present, the index value (I) of vocabulary index buffer is incremented by one, and the next vocabulary unit contained within the buffer is selected. The process is then repeated until the end of the vocabulary index buffer is reached and the answer to the query is "yes" that the message is complete. It is to be recognized, however, that the test message, as just described, is replayed only during initialization. Upon completing the test message and thereafter, the voice generator 50 is then ready to receive and respond to the various messages that are received by the aircraft's receiver 48.

Upon completing the test message, the voice generator 50 assumes its zero mode by setting the mode register contained within the microprocessor 56 [i.e. a portion of its internal random access memory (RAM)] to a value of zero and clears the value in the running checksum register, also contained in the microprocessor's RAM, to its initial value. The voice generator 50 next reads the aircraft identification code that is established by the parallel interface 52, and which, in turn, is preset by the aircraft identification thumb wheel switches contained in the parallel interface 52, and stores the aircraft identification code value in another register contained within the microprocessor's RAM. It is to be noted also that each microprocessor 56 in each aircraft reads its own aircraft identification code for each and every message that is transmitted, since a controller may from time to time require an aircraft to change its identification code.

Upon storing the aircraft identification code, the microprocessor 56 then queries the demodulator 78 by the control portion of the bus 80 to determine if a valid character (i.e. code) has been received and is ready to be processed. If the digital decoder 54 does not indicate that it is ready, the microprocessor 56 again reads the aircraft identification code and again checks for a control signal from the digital decoder 54. This process thus continues until both of the conditions are met, and in which event, the microprocessor 56 accepts one character from the digital decoder 54. This character is then compared to a sync character that has been stored in an additional register of the microprocessor's RAM to determine if a match exists. If a match does not occur the microprocessor 56 queries its mode register to see if it is in the fourth mode. If it is not in the fourth mode, it adds the value of the character that has been received and checked to the initial value contained in the running checksum register. The microprocessor 56 then branches to the mode contained within its mode register. Since in the present case, the microprocessor 56 is in its zero mode, it again branches to the zero mode and re-enters the program at the "first entry point" (i.e. indicated by a circle enclosing a 1) and continues through the idle loop until a sync character is detected.

Assuming the next character is a sync code and it matches the sync code contained within the sync code register, the microprocessor 56 increments the mode register by "one" so that the program is placed in its first mode and wherein it next expects the start of a message code. First, however, the microprocessor 56 sequentially calls the next two characters from the digital decoder 54 to see if they too match the sync code; and each time the programs loops, looking for the start of the next message code. Assuming that the next two codes match the sync code, the program continues in mode 1 until the start of message code is detected. Once the the fourth character or start of message code is received and compared to the stored sync code, the codes won't match and the microprocessor 56 will check to see if the mode register is in the fourth mode. If the mode register is not in the fourth mode, the start of message code is added to the value of the running checksum and the program then branches to the first mode.

Figure 7B:
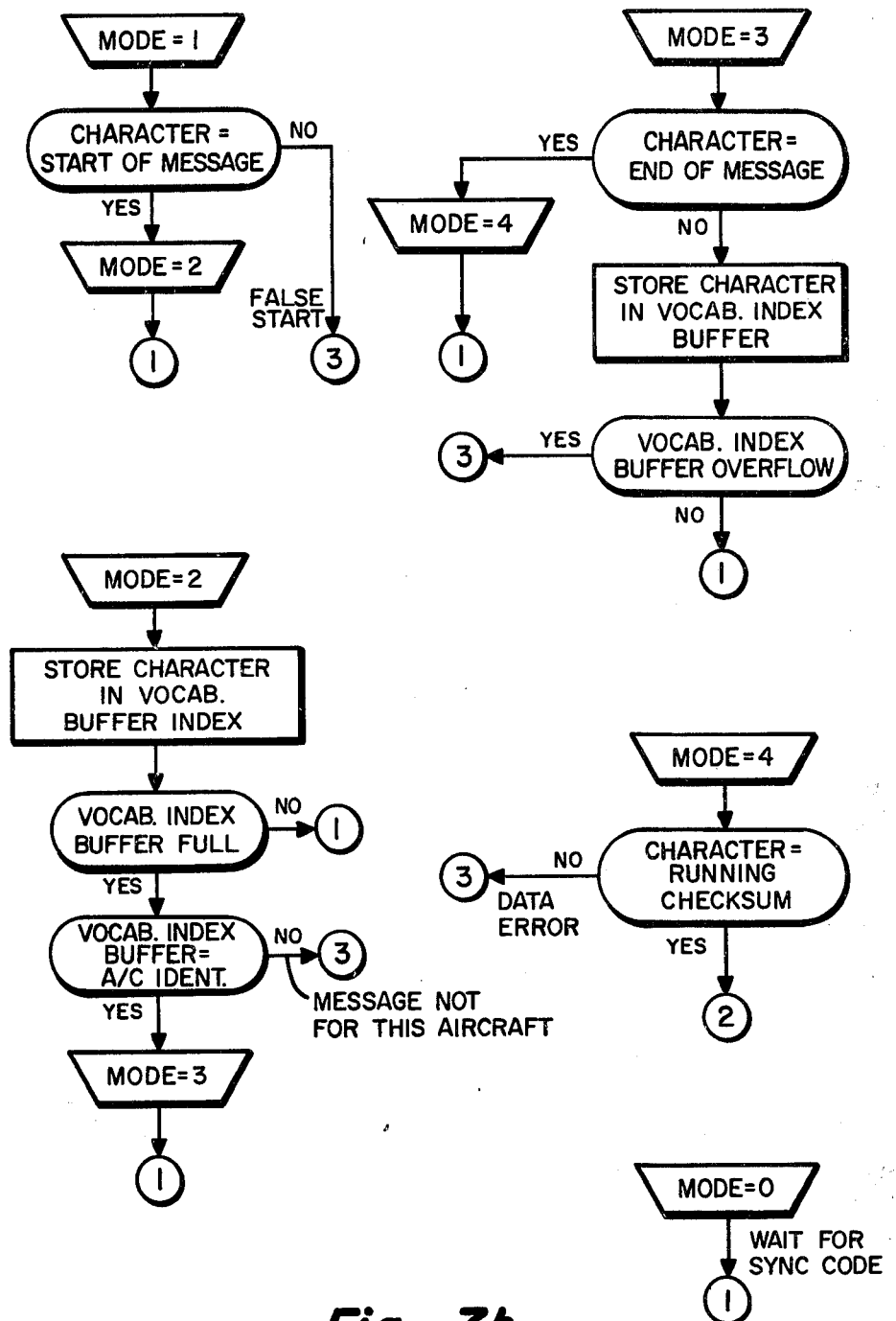

Referring now to the first mode branch in FIG. 7*b*, the microprocessor 56 compares the fourth code or presumably start a message code to the character contained within the start of message register of the microprocessor 56. If a match occurs the mode register is incremented by "one" to its second mode. If a match does not occur, a false start is indicated and the program returns to the "third entry point" and the mode register and running checksum registers are cleared to their zero values. Assuming, however, that a start of message code is detected, the mode register is incremented by "one" and thus switches to its second mode and the program re-enters itself at the "first entry point." The program then looks for the fifth character or aircraft identification code that normally follows the start of message code. Prior to describing the second mode, though, it should be recalled, that the aircraft identification code contains seven bits of data, as opposed to the six bit bytes that are received for each of the other codes. The microprocessor 56, however, is capable of handling eight bits so no problems are encountered with this anomaly and again the microprocessor 56 performs each of the idle loop steps and adds the fifth code to the accumulated value in the running checksum register and branches to the second mode that is now contained within the mode register.

Referring to the second mode branch of FIG. 7*b*, the aircraft identification code or fifth character is next read from the digital decoder 54 and stored in the vocabulary index buffer. The microprocessor 56 then checks to see if the portion of the vocabulary index buffer that contains the received aircraft identification code is full (i.e. all seven digits have been received), and if not, it re-enters the program at the first entry point and which activity permits additional time for the aircraft identification code to be written into the vocabulary index buffer. Assuming, however, that the aircraft identification portion of the vocabulary buffer is full, the microprocessor 56 then compares the previously stored aircraft identification code, which corresponds to the thumb wheel settings and which is stored in the microprocessor's RAM, to the value in the vocabulary index buffer to see if a match exists. If a match does not occur, the microprocessor 56 interprets this to mean that the message is not for this aircraft, and therefore it ignores the remainder of the message. If, however, a match occurs, the mode register is incremented to its third mode and the microprocessor 56 re-enters its program at the first entry point.

Upon receipt of the sixth character or the first vocabulary unit code of the message, the program again runs through its idle loop and assuming that all the conditions have been met and that the running checksum register has been updated, the program then branches to its third mode. Referring to the third mode of FIG. 7b, the microprocessor 56 first compares the character stored in its end of message code register to the received character. Assuming a match does not occur, the sixth character is stored within the vocabulary index buffer at the zero index position (i.e. I=0). The microprocessor 56 then checks the vocabulary identification buffer to determine if an overflow condition has occurred. If an overflow occurs, it interprets this as an error and the program re-enters itself at the third entry point and begins anew. If, however, an overflow does not occur, the program re-enters itself at the first entry point. Subsequently and sequentially, each of the additional vocabulary unit codes are similarly received and stored within the vocabulary index buffer at the next successive index values. It is to be recalled though that only a maximum of thirty-one entries can be received before the end of message code so that this process may continue for up to thirty-one cycles.

Upon receipt of all the vocabulary unit codes of the message and recalling that all the received character codes have been added to the initial value of the running checksum, the receipt of the next character code or end of message code should cause a match to occur upon comparison with the end of message code stored in the microprocessor's end of message code register. Upon the occurrence of this match, the mode register is incremented by "one" to its fourth mode and the microprocessor 56 again re-enters its program at the first entry point.

Thus, upon receipt of the next and last character code or checksum character, the program should produce a match when it queries the mode register to see if it is in its fourth mode. With this match, the program then branches to the fourth mode of FIG. 7b and compares the last character to the current sum contained within the running checksum register. If a match does not occur, the microprocessor 56 re-enters the program at the third entry point and resets the mode register to zero and begins anew. If, however, as would be expected, a match does occur, the microprocessor 56 re-enters the program at the second entry point. The microprocessor 56 then, as with the test program, reads out the various successive vocabulary unit codes stored within the vocabulary index buffer for the various index values. And, each vocabulary unit code is thus used to form an address into the vocabulary memory 60 which is read in a table lookup fashion to determine each of the ADPCM coded units of speech that are stored therein.

The ADPCM codes are next converted from their four bit ADPCM format to the eight bit PCM format, and which PCM signals are, in turn, transmitted to the digital-to-analog converter 62 where they are converted at a frequency of 6,000 samples per second. The analog output produced by the digital-to-analog converter 62 is then low-pass filtered by the low-pass filter 64 to remove any quantization noise that may exist above the speech band.

The filtered, analog signal is next mixed via the mixer 66 with the signal that is currently being received from the receiver 48 via line 67. It is to be noted that, in general, voice communications will not be occurring during this time so that the voiced traffic warning will not be superimposed over any voiced communications on line 67. It is possible, however, for the above effect to occur, and in which event a "cocktail party" effect would occur. However, a listener could adjust to this effect and mentally filter out one or the other of the conversations, but in general, this cocktail party effect is not desired and the listener would thus typically hear only the voiced traffic warning message. The mixed analog audio from the mixer 66 is next amplified via the two input, operational amplifier 68 and the amplified audio is then heard by the pilot via his head set.

A ground controller is thus able to selectively transmit a voiced traffic warning message, merely by pushing a button—typically the controller would do this after positioning his cursor over the aircraft on his/her screen so that the proper aircaft identification codes would be entered into the message—and thereby free himself to address other conflict situations and similarly transmit messages to each of these aircraft. Furthermore, each message only takes approximately 0.3 seconds and does not disrupt other voiced communications. The time savings clearly being significant over voiced instructions from the controller.

While the present invention has been described with reference to its preferred embodiment, it is to be noted that variations or alternative embodiments may suggest themselves to those of skill in the art, upon a reading hereof. Therefore, the following claims should be interpreted broadly to include any such equivalents.

What is claimed is:

1. A voice communication system comprising:
   means for producing relative position data as between at least a first and a second moving object;
   means for frequency encoding said relative position data into a coded advisory message;
   means for transmitting said frequency encoded message to at least one of said moving objects;
   means responsive to said transmitted message for decoding said transmitted message and generating a voiced advisory message, whereby a person receiving said advisory message can take appropriate corrective action depending upon the positional difference with respect to other nearby objects.

2. A voiced communication system as set forth in claim 1 wherein said voice generating means comprises:
   means for decoding said frequency encoded messages;
   memory means for storing the vocabulary of said voiced advisory messages;
   programmable means for controlling the decoding of said frequency encoded messages and the format and order of the vocabulary selected from said vocabulary store;
   means for converting the words of each message into an analog signal that can be heard by a listener, whereby the listener hears an intelligible voiced advisory message.

3. A voiced communication system as set forth in claim 2 wherein said decoding means comprises:
   means for bandpass filtering said received message;
   means for limiting the dynamic range of said received messages; and
   means for demodulating said received messages into corresponding binary encoded messages.

4. A voice communication system as set forth in claim 2 wherein said voice generating means includes:
   means for establishing a unique identity code for each object, whereby a voiced advisory message will not be produced if the frequency encoded message doesn't contain a matching code.

* * * * *

UNITED STATES PATENT AND TRADEMARK OFFICE
CERTIFICATE OF CORRECTION

PATENT NO. : 4,369,425
DATED : January 18, 1983
INVENTOR(S) : David P. Andersen and Eugene P. Chicoine It is certified that error appears in the above-identified patent and that said Letters Patent are hereby corrected as shown below:

Column 10, Between Line 59 and Line 60, insert -- means for receiving said frequency encoded messages; --

Signed and Sealed this

Fourteenth Day of June 1983

[SEAL]

Attest:

DONALD J. QUIGG

Attesting Officer

Acting Commissioner of Patents and Trademarks